(12) United States Patent
Ohara et al.

(10) Patent No.: US 8,846,268 B2
(45) Date of Patent: Sep. 30, 2014

(54) COMBUSTION APPARATUS, COMBUSTION PROCESSOR, AND FUEL CELL GENERATING SYSTEM

(75) Inventors: Hideo Ohara, Osaka (JP); Masataka Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 12/375,658

(22) PCT Filed: Aug. 22, 2007

(86) PCT No.: PCT/JP2007/066268
§ 371 (c)(1),
(2), (4) Date: Jan. 29, 2009

(87) PCT Pub. No.: WO2008/023729
PCT Pub. Date: Feb. 28, 2008

(65) Prior Publication Data
US 2009/0305098 A1    Dec. 10, 2009

(30) Foreign Application Priority Data
Aug. 22, 2006  (JP) .................................. 2006-225311

(51) Int. Cl.
*H01M 8/04* (2006.01)
*F23N 5/24* (2006.01)
*F23K 5/00* (2006.01)

(52) U.S. Cl.
CPC ........ *H01M 8/04022* (2013.01); *F23N 2031/18* (2013.01); *H01M 8/04955* (2013.01); *F23N 2035/12* (2013.01); *F23N 5/242* (2013.01); *H01M 8/04776* (2013.01); *H01M 8/04686* (2013.01); *Y02E 60/50* (2013.01); *F23K 2900/05001* (2013.01); *H01M 8/04753* (2013.01); *F23K 2401/201* (2013.01); *F23K 5/007* (2013.01)
USPC ........................................ 429/512; 60/39.01

(58) Field of Classification Search
USPC .......................................................... 429/423
See application file for complete search history.

(56) References Cited

U.S. PATENT DOCUMENTS

| 2002/0127446 A1* | 9/2002 | Ueda et al. ...................... 429/19 |
| 2004/0229092 A1* | 11/2004 | Take ............................... 429/19 |
| 2005/0074644 A1* | 4/2005 | Ueda et al. ...................... 429/22 |
| 2005/0118468 A1* | 6/2005 | Adams et al. ................... 429/22 |

FOREIGN PATENT DOCUMENTS

| JP | 3-137414 | 6/1991 |
| JP | 4-086412 | 3/1992 |
| JP | 04-292744 | 10/1992 |
| JP | 11-118572 | 4/1999 |

(Continued)

OTHER PUBLICATIONS

Office Action mailed Jul. 3, 2012 issued in corresponding JP Patent Application No. 2008-530938.

*Primary Examiner* — Ula C Ruddock
*Assistant Examiner* — Jacob Marks
(74) *Attorney, Agent, or Firm* — McDermott Will & Emery LLP

(57) ABSTRACT

There is provided a combustion apparatus including a gas supply path 1 for supplying a combustible gas, a burner main body 4 for combusting the combustible gas supplied from the gas supply path 1, a cabinet 8 provided to cover the burner main body 4, and a gas cutoff valve 2 provided on the gas supply path 1 on an upstream side of the burner main body 4 and arranged at the outside of the cabinet 8, wherein the burner main body 4 is spacially isolated from the gas cutoff valve 2.

11 Claims, 7 Drawing Sheets

(56) References Cited

FOREIGN PATENT DOCUMENTS

| JP | 2004-278915 A | 10/2004 |
| JP | 2005-214090 A | 8/2005 |
| JP | 2006-066107 | 3/2006 |

* cited by examiner

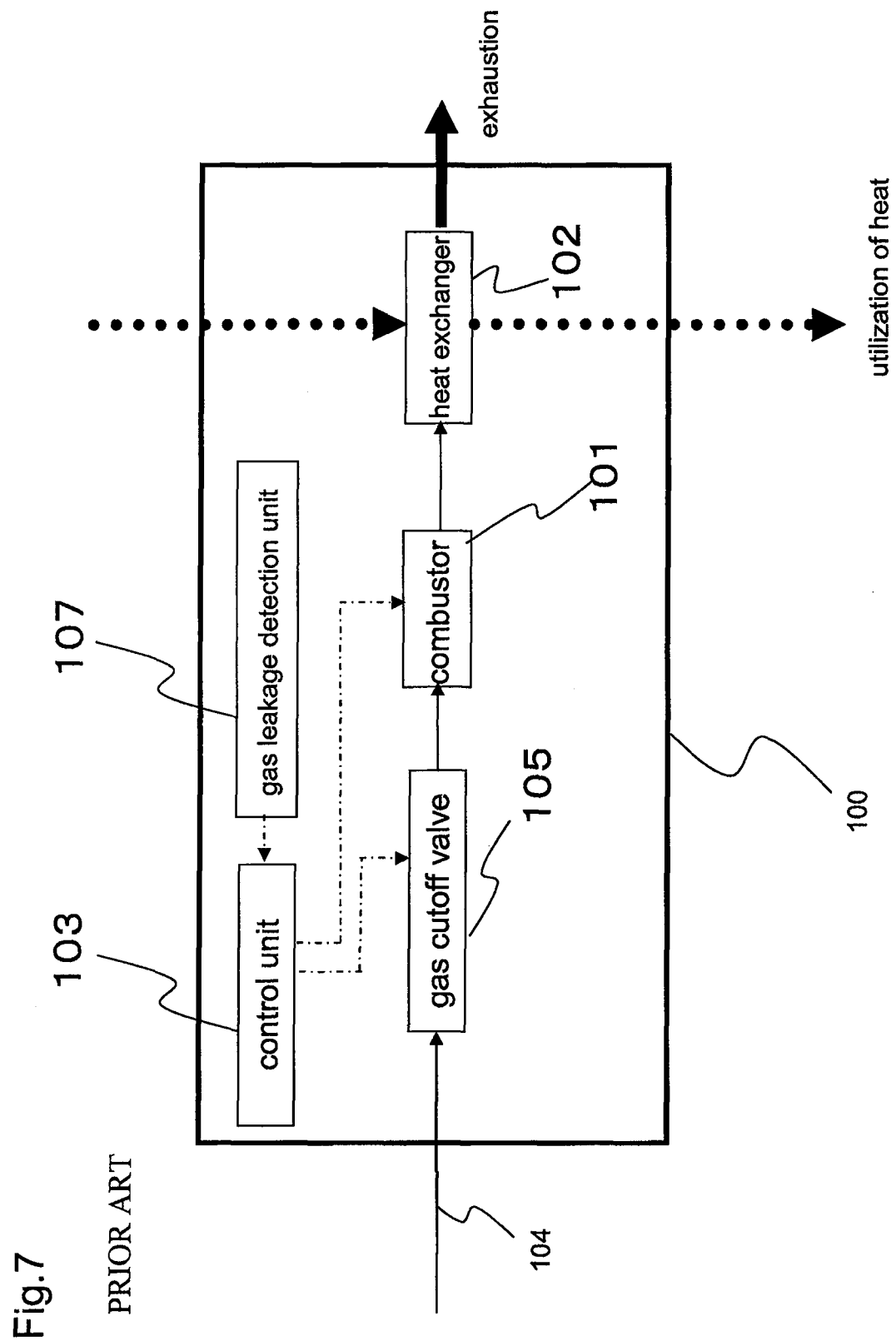

COMBUSTION APPARATUS, COMBUSTION PROCESSOR, AND FUEL CELL GENERATING SYSTEM

CROSS-REFERENCE TO RELATED APPLICATIONS

This application is a U.S. national phase application of PCT International Patent Application No. PCT/JP2007/066268 filed on Aug. 22, 2007, claiming the benefit of priority of Japanese Patent Application No. 2006-225311 filed on Aug. 22, 2006, all of which are incorporated by reference herein in their entirety.

TECHNICAL FIELD

The present invention relates to a combustion apparatus, a fuel processing apparatus, and a fuel cell power generation system.

BACKGROUND ART

According to a combustion apparatus of a background art, mainly, a gas supply path thereof and a gas supply portion on a primary side (gas infrastructure side) are connected by way of a gas pipe, a gas is supplied to the combustion apparatus, and heat by combustion is utilized for hot water supply or the like.

FIG. 7 is a block diagram showing a constitution of the combustion apparatus of the background art. As shown in FIG. 7, the combustion apparatus of the background art generally includes a combustor 101, a heat exchanger 102 of transferring heat thereof to water or the like, control parts of controlling to supply gas, combustion air, heat recovery water or the like respectively to the combustor 101 and the heat exchanger 102, and a control unit 103 of controlling the control parts.

Further, it is general that a gas cutoff valve 105 is provided on a downstream side of a portion of connecting a gas pipe and a gas supply path 104 of the combustion apparatus, and the combustion apparatus is constituted such that a total thereof including the gas cutoff valve 105, the combustor 101 and the heat exchanger 102 and the like is covered by a cabinet 100 constituted by a metal or the like. That is, the gas cutoff valve 105 is arranged at the inside of the cabinet 100 along with the combustor and the heat exchanger 102 and the like (refer to, for example, JP-A-4-292744).

As a measure against gas leakage of the combustion apparatus, there is adopted a constitution in which a gas leakage detection unit 107 is installed at the inside of the combustion apparatus, and gas leakage is prevented by cutting off the gas cutoff valve by the control unit 103 of the combustion apparatus by a detect signal detecting the gas leakage.

DISCLOSURE OF THE PRESENT INVENTION

Problems that the Invention is to Solve

Although when the gas leakage is detected as described above, and the gas supply to a secondary side (combustion apparatus side) disposed on the downstream side of the gas cutoff valve 105 is cut off, no problem is posed when the gas cutoff valve 105 is normal. However, when the gas cutoff valve 105 fails, a gas can leak from the gas cutoff valve 105 per se to the outside of the gas supply path 104 (outside leakage). Further, in contrast to the outside leakage, inside leakage shows a state in which even when the gas cutoff valve 105 is brought into a stop state, the gas supply path 104 is not stopped since the gas cutoff valve 105 is destructed, and the combustible gas is supplied to a side of the combustor 101 through inside of the gas supply path 104.

When such an outside leakage is brought about, since the gas cutoff valve 105 is arranged at the inside of the cabinet 100 along with the combustor 101 and the heat exchanger 102 and the like, there is a concern that the gas leaked outside is filled at the inside of the cabinet 100 and a volume at the inside of the cabinet is filled with a gas mixture in a combustion range, and a gas falling into an explosion range is ignited by high temperature formation of a burner main body of the combustor 101, or a spark generated at a relay circuit or a high voltage portion at the inside of the control unit 103 and there is a case of deteriorating the safety.

In consideration of the problem of the combustion apparatus of the background art, it is an object of present invention to provide a combustion apparatus, a fuel processing apparatus, and a fuel cell power generation system capable of avoiding a dangerous event of firing or the like and maintaining safety even when a gas leakage from a gas cutoff portion of a gas cutoff valve or the like to outside of a gas supply path is generated.

The $1^{st}$ aspect of the present invention is a combustion apparatus, comprising:
 a gas supply path for supplying a combustible gas;
 a combustor for combusting the combustible gas supplied from the gas supply path;
 a path of an exhaust gas exhausted from the combustor, the path being connected to the combustor;
 a controller of controlling combustion of the combustor; and
 one or more of gas cutoff valves provided on the gas supply path on an upstream side of the combustor and controlled by the controller;
 wherein
 when the gas cutoff valve is a single one,
  the gas cutoff valve, and the combustor and the controller are spacially partitioned, and
 when there are plurality of the gas cutoff valves,
  in the plurality of gas cutoff valves, at least the gas cutoff valve on the upstreammost side of the gas supply path, and the combustor and the controller are spacially partitioned.

The $2^{nd}$ aspect of the present invention is the combustion apparatus according to the $1^{st}$ aspect of the present invention, further comprising:
 a cabinet provided to cover the combustor and the controller;
 wherein the gas cutoff valve spacially partitioned from the combustor and the controller is arranged at the outside of the cabinet.

The $3^{rd}$ aspect of the present invention is the combustion apparatus according to the $1^{st}$ aspect of the present invention, further comprising:
 a cabinet provided to cover the combustor, the controller, and the one or more of gas cutoff valves; and
 a partition wall at the inside of the cabinet formed between the combustor and the controller, and the gas cutoff valve partitioned spacially from the combustor and the controller;
 wherein a first space including the gas cutoff valve spacially partitioned from the combustor and the controller, and a second space including the combustor and the controller are formed by the cabinet and the partition wall.

The $4^{th}$ aspect of the present invention is the combustion apparatus according to the $3^{rd}$ aspect of the present invention, further comprising a first communication port of communicating the first space with the atmosphere.

The 5$^{th}$ aspect of the present invention is the combustion apparatus according to the 3$^{rd}$ aspect of the present invention, further comprising a second communication port of communicating the second space with the atmosphere.

The 6$^{th}$ aspect of the present invention is the combustion apparatus according to the 5$^{th}$ aspect of the present invention, further comprising:

a ventilator for exhausting a gas at the inside of the second space to the atmosphere from the second communication port;

wherein the gas at the inside of the second space is forcibly exhausted by the ventilator.

The 7$^{th}$ aspect of the present invention is the combustion apparatus according to the 1$^{st}$ aspect of the present invention, wherein the combustible gas includes an odorizing component.

The 8$^{th}$ aspect of the present invention is the combustion apparatus according to the 7$^{th}$ aspect of the present invention, further comprising:

an odorizing component remover provided at the gas supply path for removing the odorizing component;

wherein the odorizing component remover is provided on a downstream side of the gas cutoff valve when the gas cutoff valve is a single one, and the odorizing component remover is provided on a downstream side of the gas cutoff valve on the upstreammost side of the gas supply path when there are a plurality of the gas cutoff valves.

The 9$^{th}$ aspect of the present invention is the combustion apparatus according to the 1$^{st}$ aspect of the present invention, further comprising:

a combustible gas sensor provided at a space on a side of the combustor and the controller for detecting the combustible gas leaked to inside of the space;

wherein the controller controls to cut off the one or more of gas cutoff valves based on a detecting value of the combustible gas sensor.

The 10$^{th}$ aspect of the present invention is a fuel processing apparatus, comprising:

the combustion apparatus according to any one of the 1$^{st}$ aspect of the present invention through the 9$^{th}$ aspect of the present invention; and a reformer of generating a hydrogen-containing gas by reforming a raw material by heating of the combustion apparatus.

The 11$^{th}$ aspect of the present invention is a fuel cell power generation system, comprising:

the fuel processing apparatus according to the 10$^{th}$ aspect of the present invention; and a fuel cell of generating power by using a hydrogen-containing gas delivered from the fuel processing apparatus.

Advantage of the Present Invention

According to the present invention, it is an object thereof to provide a combustion apparatus, a fuel processing apparatus, and a fuel cell power generation system capable of avoiding a dangerous event of firing or the like and maintaining a safety even when a gas leakage from a gas cutoff portion of a gas cutoff valve or the like to outside of a gas supply path is brought about.

BRIEF DESCRIPTION OF THE DRAWINGS

FIG. 7 is a block diagram showing an outline constitution of a combustion apparatus of a background art.

DESCRIPTION OF REFERENCE NUMERALS AND SIGNS

Figure 1:
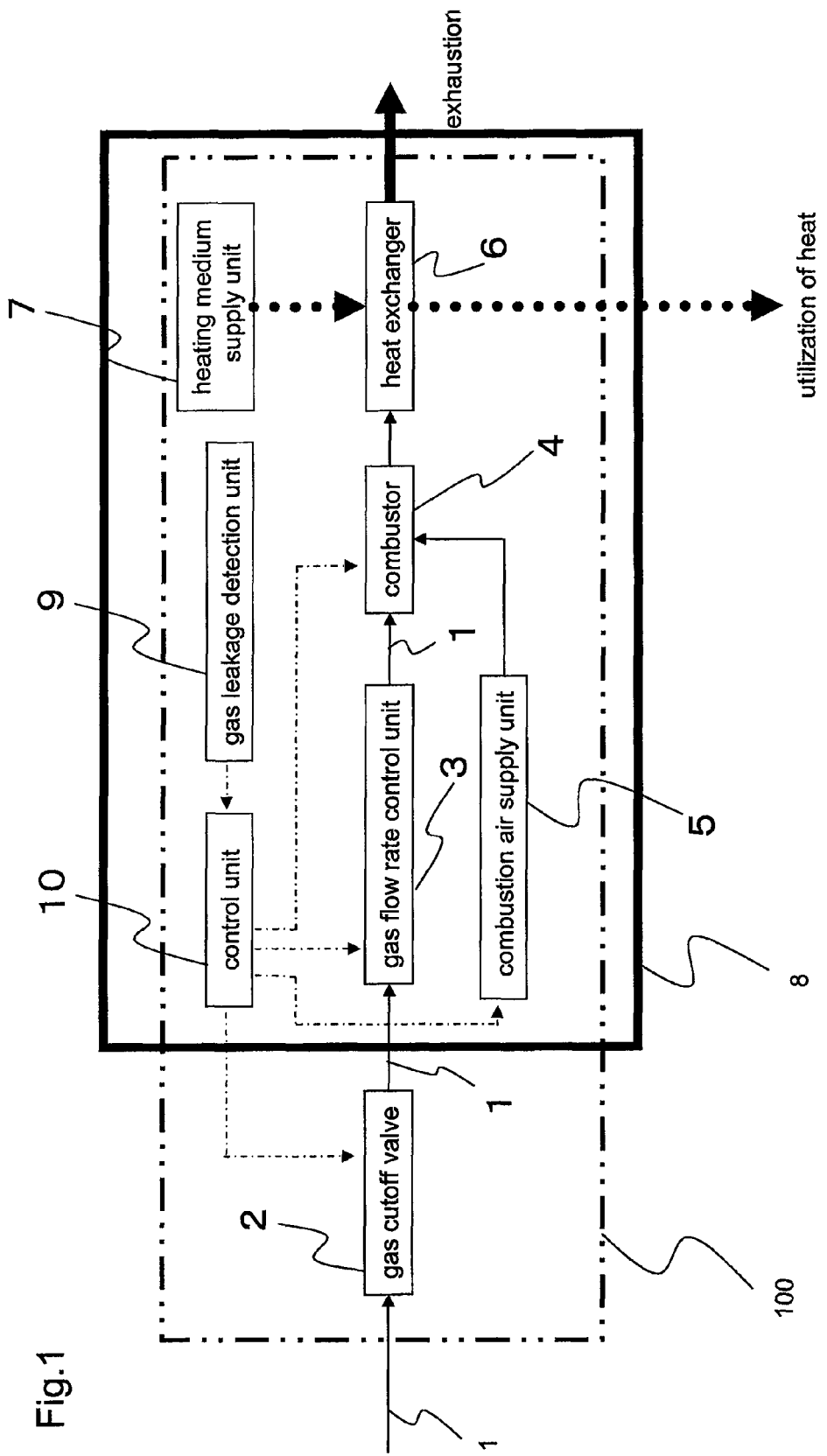
FIG. 1 is a block diagram showing outline constitutions of a combustion apparatus in Embodiment 1 according to present invention and a background art.

1 . . . gas supply path
2 . . . gas cutoff valve
3 . . . gas flow rate control unit
4 . . . combustor
5 . . . combustion air supply unit
6 . . . heat exchanger
7 . . . heating medium supply unit
8 . . . cabinet
9 . . . gas leakage detection unit
10 . . . control unit
11 . . . cabinet
11a, 11b . . . blocks
12 . . . partition wall
13 . . . ventilation fan
14 . . . intake port
15 . . . fuel processor
16 . . . combustor
17 . . . distributor
18 . . . water supply unit
19 . . . stack
20 . . . air supply unit

BEST MODE FOR CARRYING OUT THE PRESENT INVENTION

Contents of embodiments according to present invention will be explained in reference to the drawings as follows.

Embodiment 1

FIG. 1 is a block diagram showing an outline constitution of a combustion apparatus according to Embodiment 1 of the present invention. The combustion apparatus of the embodiment includes a gas supply path 1 for supplying a combustible gas from a gas infrastructure side, and a combustor 4 in correspondence with an example of a burner main body of present invention for combusting a supplied combustible gas. The gas supply path 1 on an upstream side of the combustor 4 is arranged with a gas flow rate control unit 3 for controlling a flow rate of a combustible gas supplied to the combustor 4. Further, the gas supply path 1 on an upstream side of the gas flow rate control unit 3 is arranged with a gas cutoff valve 2 for cutting off the combustible gas. The gas cutoff valve 2 is a normally closed valve and can prevent the combustible gas from being supplied to the combustor 4 by being brought into a closed state in a case of stoppage of power supply or the like.

Further, a combustion air supply unit 5 for supplying combustion air in accordance with a flow rate of the combustible gas to the combustor 4, and a heat exchanger 6 to which a combustion gas combusted at the combustor 4 is introduced are provided. A heating medium supply unit 7 of supplying a heating medium to the heat exchanger 6 is provided for utilizing heat absorbed from the combustion gas to the heat exchanger 6 by introducing the combustion gas. Further, a control unit 10 of controlling a combustion operation of the combustor 4 by controlling operations of the gas cutoff valve 2, the gas flow rate control unit 3, the combustor 4, and the fuel air supply unit 5 and the like is provided.

Further, the gas flow rate control unit 3, the combustor 4, the combustion air supply unit 5, the heat exchanger 6, the heating medium supply unit 7, and the control unit 10 are covered by a cabinet 8 formed by a metal. Inside of the cabinet 8 is arranged with a gas leakage detection unit 9 for monitoring gas leakage. The gas leakage detection unit 9 includes a combustible gas sensor. The gas leakage detection unit 9 determines whether a gas is leaked by a value detected by the combustible gas sensor, and when it is determined that the gas is leaked, the control unit 10 operates the gas cutoff valve 2 and gas supply from the infrastructure side is cut off. Further, the gas cutoff valve 2 is arranged at the outside of the cabinet 8.

Next, an operation of the combustion apparatus of the embodiment will be explained.

According to the combustion apparatus, in a normal combustion operation, the combustible gas passes from the gas supply path 1 to the gas cutoff valve 2 by opening the gas cutoff valve 2 by the control unit 10, and is supplied to the combustor 4 on a downstream side by measuring a predetermined amount thereof by the gas flow rate control unit 3. On the other hand, combustion air in accordance with the measured and supplied gas is supplied from the combustion air supply unit 5 to the combustor 4 and combusted at the combustor 4 by being controlled by the control unit 10. The combusted high temperature gas exchanges heat to a heating medium of water or the like at the heat exchanger 6 on the downstream side and is exhausted. Water subjected to heat exchange is utilized as hot water.

When the combustion operation of the combustion apparatus is stopped, the control unit 10 stops the gas cutoff valve 2, stops supplying the combustible gas to the combustor 4, and also stops supplying the combustion air from the combustion air supply unit 5 to the combustor 4.

As described above, the combustion apparatus of the embodiment is covered by the cabinet 8 formed by a metal by excluding the gas cutoff valve 2, inside thereof is provided with the gas leakage detection unit 9 and outside leakage of the gas is monitored. When a gas leakage is accidentally brought about in the combustion operation of the combustion apparatus, the gas leakage detection unit 9 detects leakage of the combustible gas and supplies a detecting signal to the control unit 10. When the detecting signal is received, the control unit 10 stops supplying the combustion air from the combustion air supply unit 5, cuts off the gas cutoff valve 2, prevents continuous leakage of the gas by stopping to supply the combustible gas and prevents damage from being enlarged.

Here, when gas leakage from the gas cutoff valve 2 to the outside of the gas supply path 1 cannot be cut off by failing of the gas cutoff valve 2 per se even when the gas cut off valve is closed by (normally stopping the combustion operation of the combustion apparatus,) or is closed by leakage of the combustible gas or the like. According to the cabinet of the background art (cabinet 100 indicated by two-dotted chain line of FIG. 1), when the gas leakage cannot be cut off, there is a concern of filling the inside of the cabinet 100 with gas, because the gas cutoff valve 2 is disposed at the inside of the cabinet 8.

In contrast thereto, the combustion apparatus of the embodiment is constituted of it so that the gas cutoff valve 2 is arranged at the outside of the cabinet 8, and therefore, even when the gas cutoff valve 2 accidentally fails and leakage is generated from the gas cutoff valve 2 to outside, the leaked gas does not fill the inside of the cabinet 8. Further, a source of igniting the combustible gas, like the combustor 4 which is brought into high temperature or a relay circuit, a high voltage portion or the like at the inside of the control unit 10 is covered by the cabinet 8, and is partitioned spacially from the gas cutoff valve 2, and therefore, the combustible leakage gas is not brought into contact with the ignition source, and is diffused to outside of a system of the combustion apparatus, and therefore, the safety can be maintained.

Further, a gas is attached with an odorizing agent, and therefore, when the gas leakage is brought about, a user can discover leakage of the gas by an odor at an early stage, and therefore, the safety is promoted and a commercial performance is promoted.

Further, when a microcomputer gas meter is provided at the gas supply path 1 on an upstream side of the gas cutoff valve 2, even in a case in which gas leakage is brought about from the gas cutoff valve 2 to outside of the gas supply path 1, when an amount of the leakage is constant or more, by a protection operation function of the microcomputer gas meter, the gas supply path is swiftly cut off by a gas cutoff valve provided at the inside of the microcomputer gas meter.

However, when an outside leakage amount from the gas cutoff valve is small, the protection operation function is not swiftly operated but, for example, the gas supply path is not cut off until a number of days of about 30 days has elapsed. In this case, when the combustor and the control unit are present at the inside of a space the same as that of the gas cutoff valve as in the combustion apparatus of the background art, similarly, depending on the amount of leakage to inside of the cabinet, there is a concern of igniting the gas by the burner main body brought into high temperature or a spark generated at a relay circuit or a high voltage portion at the inside of the control unit.

In this way, according to the combustion apparatus of the embodiment, with regard to the problem of outside leakage of the gas cutoff valve in which there is a case which is difficult to deal with even when the microcomputer gas meter having the normal protection operation function is provided, an effect of maintaining the safety further can be achieved.

Further, although according to the embodiment, only one of the gas cutoff valve is provided, a constitution of providing a plurality of gas cutoff valves may be constructed in order to further firmly prevent the leakage. The plurality of gas cutoff valves are simultaneously controlled to open and close.

Figure 2:
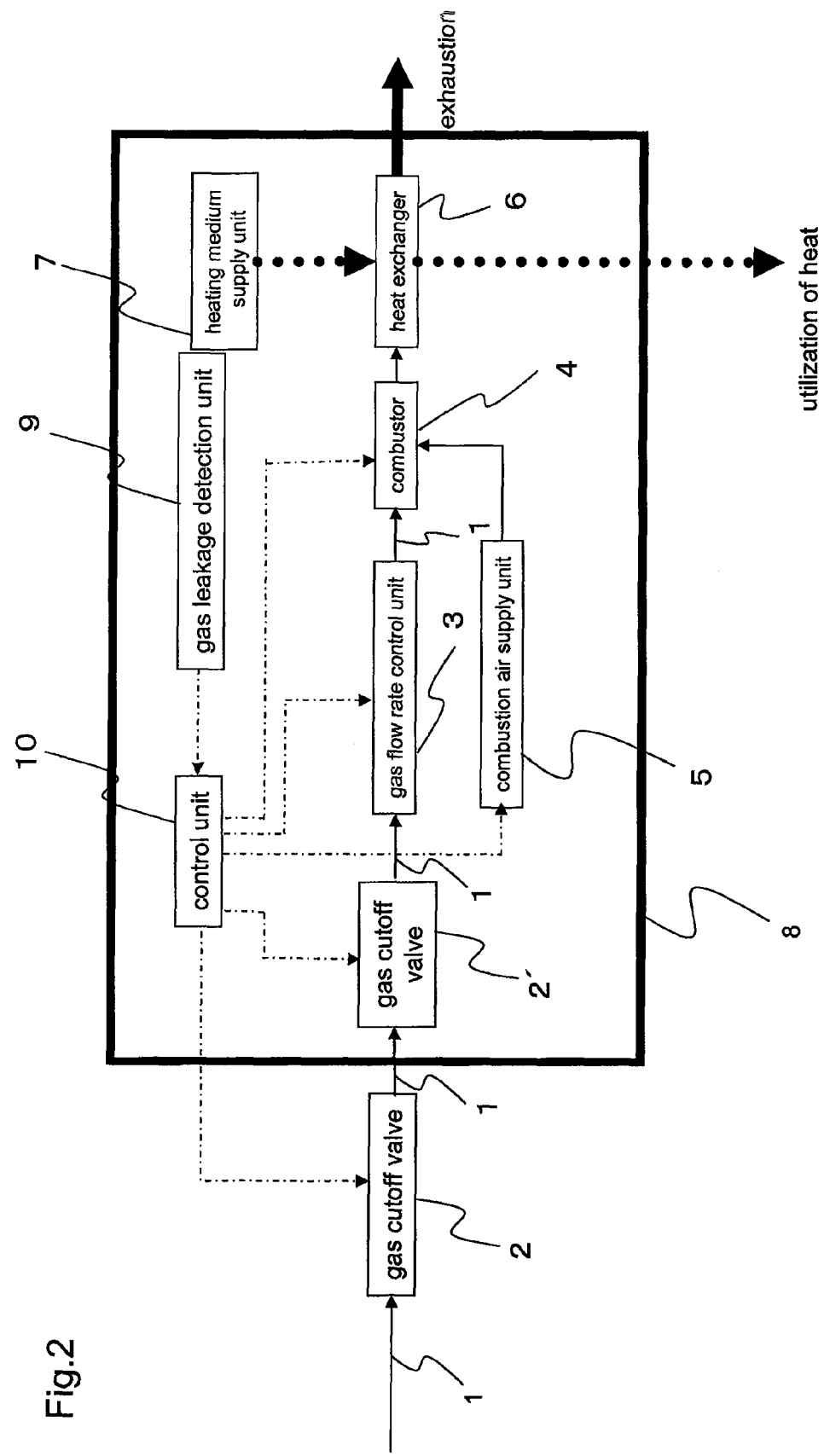
FIG. 2 is a block diagram showing an outline constitution of a combustion apparatus in a modified example of Embodiment 1 according to the present invention.

FIG. 2 is a constitution diagram of a combustion apparatus provided with two of gas cutoff valves as an example of a case of providing a plurality of gas cutoff valves.

According to the combustion apparatus shown in FIG. 2, a gas cutoff valve 2' is further provided between the gas cutoff valve 2 and the gas flow rate control unit 3. The gas cutoff valve 2' is arranged at the inside of the cabinet 8.

By arranging the plurality of gas cutoff valves in this way, even when the gas cutoff valve 2' at the inside of the cabinet 8 fails, so long as the gas cutoff valve 2 on the upstream side does not fail, the gas supply path 1 is closed by closing the gas cutoff valve 2, and a flow of the gas to inside of the gas supply path 1 can be stopped, and therefor, outside leakage from the gas cutoff valve 2' can be prevented.

On the other hand, when the gas cutoff valve 2 fails, and the gas is leaked to outside from the gas cutoff valve 2, the outside leakage cannot be stopped. However, since the gas cutoff valve 2 is arranged at the outside of the cabinet 8, the leakage gas does not fill the inside of the cabinet 8, and therefor a gas is restrained from being ignited by the combustor 4 which is brought into high temperature, or by a relay circuit, or a high voltage portion or the like at the inside of the control unit 10, at the inside of the cabinet 8, and therefore, the safety can be ensured.

Further, the gas cutoff valve 2' may be arranged not between the gas cutoff valve 2 and the gas flow rate control unit 3 but between the gas flow rate control unit 3 and the combustor 4, or similar to the gas cutoff valve 2, also the gas cutoff valve 2' may be arranged at the outside of the cabinet 8.

Further, there may be constructed a constitution of arranging the gas cutoff valve 2' also between the gas flow rate control unit 3 and the combustor 4 to arrange a total of 3 pieces of the gas cutoff valves, and a number of the gas cutoff valves provided on the gas supply path 1 reaching the combustor 4 is not limited. In sum, when the plurality of gas cutoff valves are provided at the gas supply path 1, at least the gas cutoff valve of the gas supply path 1 on the upstreammost side may be arranged at the outside of the cabinet 8. This is because although in a case in which the upstreammost gas cutoff valve does not fail, even when the gas cutoff valve on the downstream side of the upstreammost gas cutoff valve fails, the gas flow at the inside of the gas supply path on the downstream side of the upstreammost gas cutoff valve is stopped by cutting off the upstreammost gas cutoff valve, and the combustible gas is restrained from being leaked from the gas cutoff valve on the downstream side, when the upstreammost gas cutoff valve fails, the leakage of the combustible gas from the gas cutoff valve cannot be restrained. Further, the upstreammost gas cutoff valve of the gas supply path 1 is controlled to open and close by the control unit 10 along with the gas cutoff valve on the downstream side, and does not correspond to the gas cutoff valve at the inside of the microcomputer gas meter.

Embodiment 2

Figure 3:
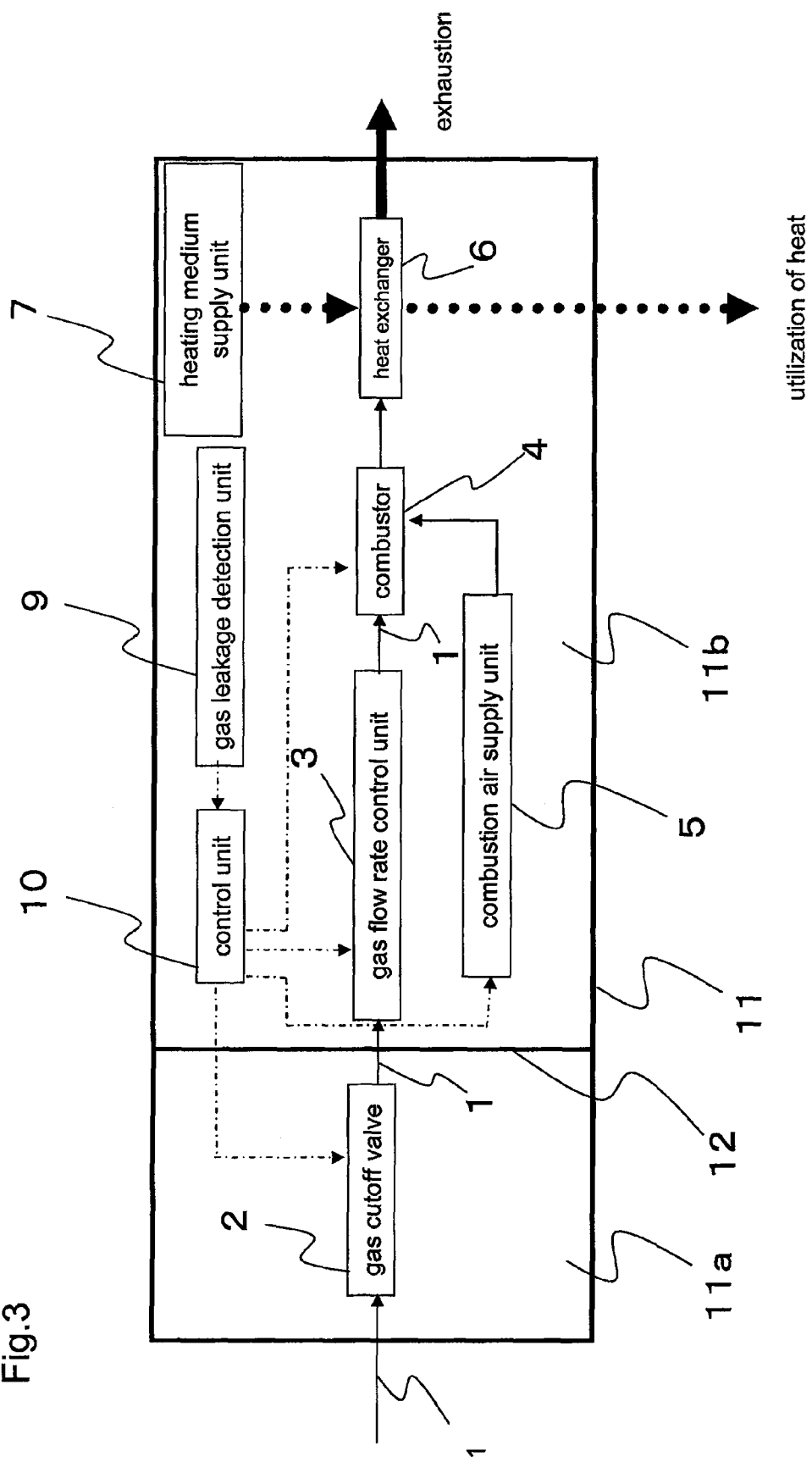
FIG. 3 is a block diagram showing an outline constitution of a combustion apparatus in Embodiment 2 according to the present invention.

FIG. 3 is a block diagram of a combustion apparatus of Embodiment 2 according to the present invention.

Although a basic constitution of the combustion apparatus of Embodiment 2 is the same as that of Embodiment 1, a constitution of a cabinet differs. Therefore, an explanation will be given by centering on the point of difference. Further, constituent elements the same as those of Embodiment 1 are attached with the same notations.

According to the combustion apparatus of Embodiment 2, different from Embodiment 1, the cabinet 11 is divided into two blocks 11a, 11b isolated from each other in an airtight condition, the gas cutoff valve 2 and other constituent parts (the gas flow rate control unit 3, the combustor 4, the combustion air supply unit 5, the heat exchanger 6, and the heating medium supply unit 7, the gas leakage detection unit 9, and the control unit 10) are arranged at the insides of respectively different blocks 11a, 11b. Further, an example of a first space of present invention corresponds to the block 11a of the embodiment and an example of a second space of present invention corresponds to the block 11b of the embodiment.

In the combustion apparatus of such a constitution, when the combustible gas is leaked from the above-described gas cutoff valve 2 to outside of the gas supply path 1, the combustible gas is leaked only to the block 11a stored with the gas cutoff valve 2. On the other hand, the combustor 4 and the control unit 10 are not present at the inside of the block 11a leaking the combustible gas but are arranged at the inside of the block 11b, and therefore, the leaked combustible gas can be restrained from being ignited by being brought into contact with the high temperature portion of the combustor 4 or a spark generated at a relay circuit or a high voltage portion at the inside of the control unit 10.

Therefore, even when the combustible gas is leaked from the gas cutoff valve 2 to outside of the gas supply path 1, the safety can be maintained.

Further, the block 11a arranged with the gas cutoff valve 2 is an airtight member, and therefore, leakage of the combustible gas is stopped at a point in time at which leakage of the combustible gas is progressed and pressure at the inside of the block 11a is balanced with a gas supply pressure, and therefore, the safety can further be guaranteed.

Further, the gas cutoff valve 2 is protected by the cabinet 11, and therefore, the gas cutoff valve 2 can be protected against an impact from outside, corrosion by wind, rain or the like can be protected.

Further, by communicating the block 11a with the atmosphere, the combustible gas leaked to outside of the system of the combustion apparatus may be diffused similar to Embodiment 1.

Embodiment 3

Figure 4:
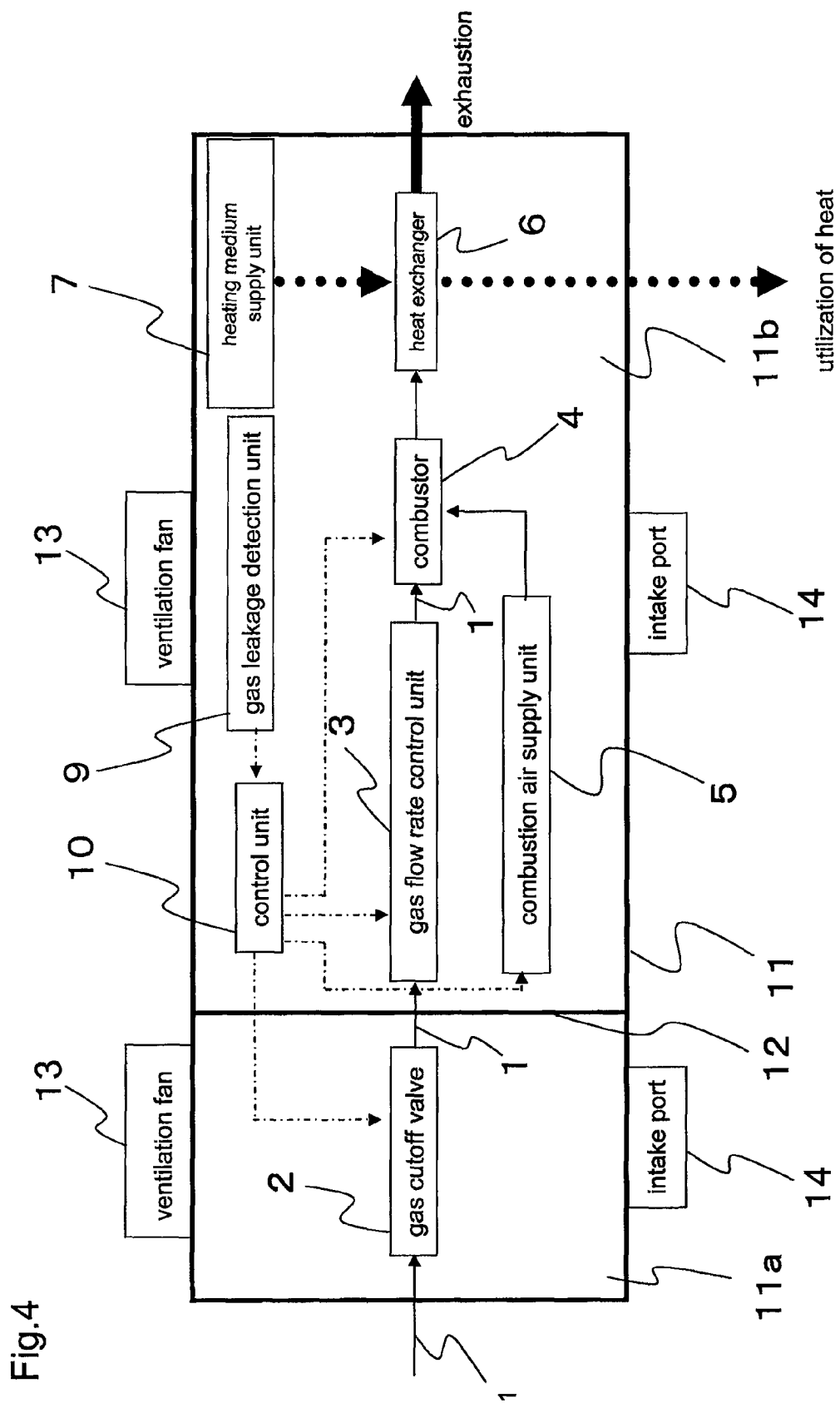
FIG. 4 is a block diagram showing an outline constitution of a combustion apparatus in Embodiment 3 according to the present invention.

FIG. 4 is a block diagram of a combustion apparatus of Embodiment 3 according to the present invention.

Although a basic constitution of the combustion apparatus of Embodiment 3 is the same as that of Embodiment 2, the combustion apparatus of Embodiment 3 differs therefrom in that the blocks 11a, 11b are not hermetically closed. Therefore, an explanation will be given centering on the point of difference. Further, constituent elements the same as those of Embodiment 2 are attached with the same notations.

The combustion apparatus of Embodiment 3 is provided with ventilation fans 13 and intake ports 14 in accordance with ventilation respectively to the two blocks 11a, 11b of Embodiment 2. Further, a first communication port of present invention is an opening portion provided at the cabinet 11 in which a space at the inside of the block 11a communicates with the atmosphere, and the combustible gas leaked to inside of the block 11a can be diffused and exhausted to the atmosphere, and as an example, a ventilation port (not illustrated) of the ventilation fan 13 provided at the block 11a of the embodiment is pointed out. Further, when the ventilation fan 13 provided at the block 11a is stopped, the gas at the inside of the block 11a is diffused and exhausted to the atmosphere also from the intake port 14 provided at the block la, and therefore, also the intake port 14 is functioned as the ventilation port of the present invention.

On the other hand, an example of a second communication port of present invention is an opening portion provided at the cabinet 11 in which a space at the inside of the block 11b is communicated with the atmosphere, and the combustible gas leaked to inside of the block 11b can be diffused and exhausted to the atmosphere, and a ventilation port (not illustrated) of the ventilation fan 13 provided at the block 11b of the embodiment is pointed out as an example of the ventilation port. Further, when the ventilation fan 13 provided at the block 11b is stopped, the gas at the inside of the block 11a is diffused and exhausted to the atmosphere also from the intake port 14 provided at the block 11b, and therefore, also the intake port 14 functions as the ventilation port of the present invention. Further, an example of the ventilator of present invention corresponds to the ventilation fan 13 of the embodiment.

In the combustion apparatus of such a constitution, when the combustible gas is leaked from the gas cutoff valve 2 to outside of the gas supply path 1, the combustible gas is leaked only to the block 11a stored with the gas cutoff valve 2, the block 11a is always ventilated, and therefore, the leaked combustible gas is diffused and exhausted to outside of the system of the combustion apparatus by way of the ventilation fan 13 in a diluted state. Further, the combustor 4 and the control unit 10 are not present at the inside of the block 11a at which the gas is leaked, but are arranged at the inside of the block 11b, and therefore, the leaked combustible gas can be restrained from being brought into contact with an ignition source like the high temperature portion of the combustor 4 or the like or a relay circuit, or a high voltage portion at the inside of the control unit 10.

As described above, even when the combustible gas is leaked from the gas cutoff valve 2 to outside of the gas supply path 1, the safety can be maintained.

Further, by ventilating other block 11b, even when the combustible gas is leaked from the system at the inside of the block 11b to inside of the space of the block 11b, the leaked combustible gas can be diffused and exhausted to outside of the block 11b, the safety can further be maintained.

Further, even when the ventilation fan 13 is not present in the block 11a, so far as a portion communicated with outside air by the intake port 14 or the like is present, the leaked gas is diffused and exhausted to the atmosphere, and therefore, the leaked gas does not fill the inside of the block 11a but is diffused to outside of the system of the combustion apparatus, and therefore, the safety can be maintained. Further, the gas is attached with an odorizing agent, and therefore, when a gas is leaked, a user can discover leakage of the gas by the odor at an early stage, the safety is promoted and the commercial performance is promoted.

Further, although there may be constructed a constitution of not providing the ventilation fan 13 also at the block 11b similar to the block 11a, it is further preferable to provide the ventilation fan 13 on the side of the block 11b since the combustible gas diffused from the block 11a and flowing to inside of the block 11b by way of the intake port 14 on the side of the block 11b can be exhausted to the atmosphere.

Further, the block 11a may be constituted by a hermetically closed space without providing the ventilation fan 13 and the intake port 14, and the side of the block 11b may be provided with only the intake port 14 or the ventilation fan 13 and the intake port 14.

Embodiment 4

Figure 5:
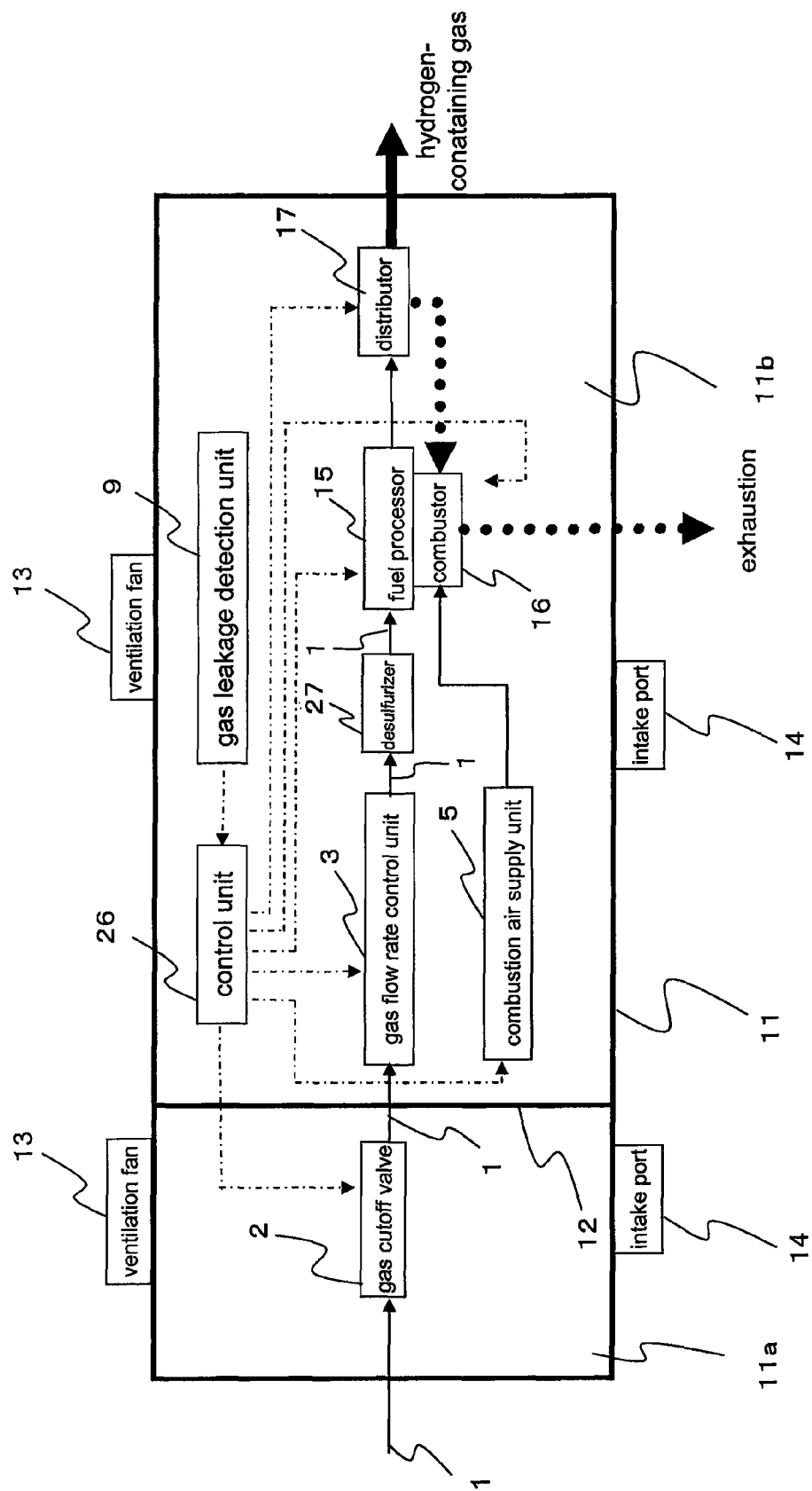
FIG. 5 is a block diagram showing an outline constitution of a fuel processing apparatus in Embodiment 4 according to the present invention.

FIG. 5 is a block diagram of a fuel processing apparatus in Embodiment 4 according to the present invention. The fuel processing apparatus of Embodiment 4 uses the combustion apparatus of Embodiment 3, and constituent elements the same as those of Embodiment 3 are attached with the same notations.

The combustion apparatus of the embodiment includes the gas supply path 1 for supplying a combustible raw material gas including an organic compound at least constituted by carbon element and hydrogen element such as methane from the gas infrastructure side, and a fuel processor 15 for generating a hydrogen-containing gas by a reforming reaction by using the supplied raw material gas. According to the fuel processor 15, hydrogen can be generated by a steam reforming method using steam, a partial oxidation reforming method of using air, an auto thermal method using the both or the like.

The gas supply path 1 on the upstream side of the fuel processor 15 is provided with a desulfurizer 27 as an example of an odorizing component remover of present invention for removing sulfur constituting an odorizing component at the inside of supplied raw material gas. The gas supply path 1 on the upstream side of the desulfurizer 27 is arranged with the gas flow rate control unit 3 for controlling the flow rate of the gas supplied to the fuel processor 15. Further, the gas supply path 1 on the upstream side of the gas flow rate control unit 3 is arranged with the gas cutoff valve 2 for cutting off supply of the gas. Further, the gas flow rate control unit 3 may be provided on the downstream side of the desulfurizer 27.

The combustor 16 for heating the fuel processor 15 is provided, and the downstream side of the fuel processor 15 is arranged with a distributor 17 for distributing the hydrogen-containing gas generated by the fuel processor 15 to outside of the system of the fuel processor and to the side of the combustor 16.

Further, the combustion air supply unit 5 for supplying combustion air to the combustor 16 in accordance with a flow rate of the hydrogen-containing gas distributed by the distributor 17 and supplied to the combustor 16 is provided. The combustion gas combusted at the combustor 16 is introduced into the fuel processor 15, supplies heat necessary for the fuel processor 15, thereafter, is exhausted as an exhaust gas.

There is provided a control unit 26 for controlling not only an operation of the combustor such as operations of the gas cutoff valve 2, the gas flow rate control unit 3, the fuel processor 15, the distributor 17, the combustor 16, and the combustion air supply unit 5 and the like but also operation of a total of the fuel processing apparatus.

The fuel processing apparatus of Embodiment 4 is provided with the cabinet 11 to cover constituent parts similar to Embodiment 3, and the cabinet 11 is divided into the two blocks 11a, 11b isolated from each other in an airtight condition by the partition wall 12 formed at the inside thereof. One block 11a is arranged with only the gas cutoff valve 2 an operation of which is controlled by the control unit 26 in constituent parts, and other block 11b is provided with the gas flow rate control unit 3, the fuel processor 15, the distributor 17, the combustor 16, the combustion air supply unit 5, and the control unit 26. The blocks 11a, 11b are respectively mounted with the ventilation fans 13, and the intake ports 14 in accordance with ventilation.

Further, inside of the block 11b is arranged with the gas leakage detection unit 9 of monitoring gas leakage at the inside thereof, and supply the gas from the infrastructure side is cut off by operating the gas cutoff valve 2 by the control unit 26 based on a gas detecting signal by the gas leakage detection unit 9.

In the fuel processing apparatus of such a constitution, when the gas is leaked from the gas cutoff valve 2 to outside of the gas supply path 1, although the raw material gas is leaked only to the block 11a stored with the gas cutoff valve 2, the block 11a is always ventilated, and therefore, the leaked raw material gas is diffused and exhausted to outside of the system of the fuel processing apparatus in a diluted state. Further, the high temperature portion of the combustor 16 or the like is not present at the inside of the block 11a in which the raw material gas is leaked but is arranged at the inside of the block 11b.

Therefore, even when the combustible gas is leaked from the gas cutoff valve 2 to outside of the gas supply path 1, the leaked combustible gas can be prevented from being brought into contact with the combustor 16 (burner main body) of heating the fuel processor 15 of reforming the raw material at high temperatures, and the leaked combustible gas can be prevented from being brought into contact with the control unit 26 of generating a spark at a relay circuit or a high voltage portion, and therefore, the fuel processing apparatus ensuring the safety can be provided.

Further, the other block 11b is arranged with the fuel processor 15 of reforming the fuel at a high temperature of 700° C. or less and the control unit 26 of generating a spark at a relay circuit or a high voltage portion, and therefore, by also ventilating the block 11b, even when the raw material gas or the hydrogen-containing gas is leaked from the system at the inside of the block 11b other than the gas cutoff valve 2, the leaked gas can be exhausted to outside, and therefore, the safety can further be maintained.

Further, even when the ventilation fan 13 is not present at the block 11a, so far as a portion communicating with outside air is present as in the intake port 14 or the like, the leaked gas is diffused and exhausted to the atmosphere, and therefore, the leaked gas does not fill the inside of the cabinet 18a but is diffused to outside of the system, and therefore, the safety can be maintained. Further, the gas is attached with the odorizing agent, and therefore, when the gas is leaked, the user can discover leakage of the gas by the odor at an early stage, the safety is promoted and the commercial performance is promoted.

Further, although there may be constructed a constitution of not providing the ventilation fan 13 also at the block 11b similar to the block 11a, it is further preferable to provide the ventilation fan 13 on the side of the block 11b such that the gas diffused from the block 11a and flowing to inside of the block 11b from the intake port 14 on the side of the block 11b can be exhausted to the atmosphere.

Further, although according to the embodiment, an explanation is given of the constitution of arranging the gas cutoff valve 2 and the other constituent parts (combustor 16, fuel processor 15 and the like) at the separate blocks 11a, 11b formed by the cabinet 11 and the partition wall 12 and providing the ventilation fans 13 and the intake ports 14 respectively for the blocks 11a, 11b, as has been explained in Embodiment 2, there may be constructed a constitution of not providing the ventilation fans 13 and the intake ports 14 (refer to FIG. 2). Further, as has been explained in Embodiment 1, there may be constructed a constitution in which the gas cutoff valve 2 is not covered by the cabinet but is exposed to outside air (refer to FIG. 1), or there may be constructed a constitution of including a plurality of the gas cutoff valves controlled by the control unit 26 at the gas supply path 1 and providing at least the upstreammost gas cutoff valve at the inside of the block 11a.

Further, the block 11a may be constituted by a hermetical closed space without providing the ventilation fan 13 and the intake port 14 and the side of the block 11b may be provided with only the intake port 14 or the ventilation fan 13 and the intake port 14.

Embodiment 5

Figure 6:
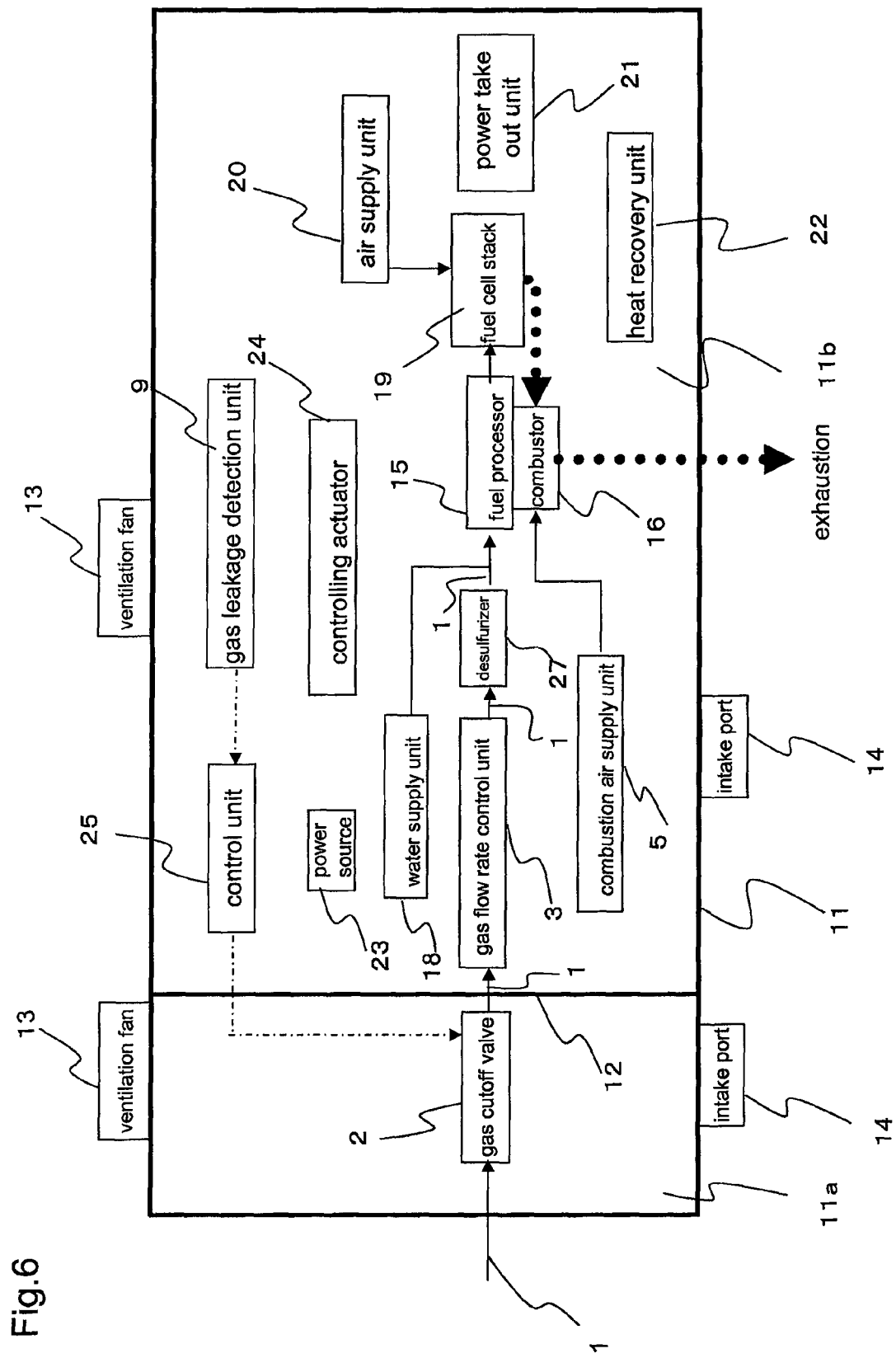
FIG. 6 is a block diagram showing an outline constitution of a fuel cell cogeneration system in Embodiment 5 according to the present invention.

FIG. 6 is a block diagram of a fuel cell cogeneration system in Embodiment 5 of an example of a fuel cell power generation system of the present invention.

The fuel cell cogeneration system of the embodiment is a system of using the fuel processing apparatus of Embodiment 4, and constituent elements the same as those of Embodiment 4 are attached with the same notations.

A reforming method used in the fuel processor 15 of the fuel cell cogeneration system of Embodiment 5 is a steam reforming method, and therefore, a water supply unit 18 for supplying steam to the fuel processor 15 is provided.

Further, a downstream side of the fuel processor 15 is provided with a fuel cell stack 19 laminated with cells each constituted by a polymer electrolyte film, an anode, a cathode, and a separator or the like. The hydrogen-containing gas generated by the fuel processor 15 is supplied to the anode of the fuel cell stack 19. On the other hand, an air supply unit 20 for supplying air to the cathode of the fuel cell stack 19 is provided. Further, a power take out unit 21 for taking out a power generated by the fuel cell stack 19, and a heat recovery unit 22 for recovering heat generated at the fuel cell stack 19 are provided.

Further, a power source 23, a controlling actuator 24 for controlling to drive the constituent parts, and a control unit 25 of controlling an operation of a total of the system including the combustion operation of the combustor 16 are provided.

The fuel cell cogeneration system of Embodiment 5 is provided with the cabinet 11 to cover the constituent parts similar to the fuel processing apparatus of Embodiment 4, and the cabinet 11 is divided into two blocks 11a, 11b isolated from each other in an airtight condition by the partition wall 12 formed at the inside thereof. One block 11a is arranged with only the gas cutoff valve 2 controlled by the control unit 25 in the constituent parts, and other block 11b is arranged with the gas flow rate control unit 3, the combustion air supply unit 5, the fuel processor 15, the combustor 16, the fuel cell stack 19, the air supply unit 20, the power take out unit 21, the heat recovery unit 22, the power source 23, the controlling actuator 24, and the control unit 25. The blocks 11a, 11b are respectively mounted with the ventilation fans 13 and the intake ports 14 in accordance with ventilation.

Further, inside of the block 11b is provided with the gas leakage detection unit 9 of monitoring gas leakage at the inside thereof, based on the gas leakage detecting signal by the gas leakage detection unit 9, the control unit 25 operates the gas cutoff valve 2, and supply of the raw material gas from the infrastructure side is cut off. Further, the control unit 25 also controls other constituent parts (gas flow rate control unit 3 and the like).

In the fuel cell cogeneration system of the above-described constitution, even when the raw material gas is leaked from the gas cutoff valve 2, since the gas cutoff valve 2, the power source, the electric device constituting the controlling actuator, a relay circuit present at the control unit 25, and a high temperature part of a fuel processor or the like are arranged in the separate blocks 11a, 11b, and therefore, firing, and therefore, an explosion or the like can be restrained from being brought about by bringing the leakage gas into contact with the high temperature part or bringing the leakage gas into contact with a spark generated at a relay circuit or a high voltage portion at the inside of the control unit 25.

Therefore, even when the raw material gas is leaked from the gas cutoff valve 2, the safety can be maintained.

Further, similar to Embodiment 4, even when the ventilation fan 13 is not present at the block 11a, so far as a portion communicating with outside air is present as in the intake port 14 or the like, the leaked raw material gas is diffused and exhausted to the atmosphere, and therefore, the leaked raw material gas does not fill the inside of the cabinet 18a but is diffused to outside of the system, and therefore, the safety can be maintained. Further, the gas is provided with the odorizing agent, and therefore, when the gas is leaked, leakage of the raw material gas can be discovered by the odor at the early stage, the safety is promoted and the commercial performance is promoted.

Further, although there may be constructed a constitution in which also the block 11b is not provided with the ventilation fan 13 similar to the block 11a, it is further preferable to provide the ventilation fan 13 on the side of the block 11b since the gas diffused from the block 11a and flowing to inside of the block 11b from the intake port 14 on the side of the block 11b can be exhausted to the atmosphere.

Further, although according to the embodiment, an explanation has been given of the constitution of arranging the gas cutoff valve 2 and other constituent parts (combustor 16, fuel processor 15 and the like) at the separate blocks 11a, 11b formed by the cabinet 11 and the partition wall 12 and providing the ventilation fans 13 and the intake ports 14 respectively for the blocks 11a, 11b, as has been explained in Embodiment 2, there may be constructed a constitution of not providing the ventilation fan 13 and the intake port 14 (refer to FIG. 2). Further, as has been explained in Embodiment 1, there may be constructed a constitution in which the gas cutoff valve 2 is not covered by the cabinet but is exposed to outside air (refer to FIG. 1), or there may be constructed a constitution in which a plurality of the gas cutoff valves controlled by the control unit 26 are provided at the gas supply path 1 and at least the upstreammost gas cutoff valve is provided at the inside of the block 11a.

Further, the block 11a can be constituted by hermetically closed space without providing the ventilation fan 13 and the intake port 14 and the side of the block 11b may be provided with only the intake port 14 or the ventilation fan 13 and the intake port 14.

Further, although the desulfurizer 27 explained in Embodiments 4, 5 is provided between the gas flow rate control unit 3 and the fuel processor 15, a catalyst of the fuel processor 15 may be made to be able to be prevented from being poisoned, and therefore, the desulfurizer 27 may be provided at any position regardless of inside and outside of the block 11b so far as the desulfurizer 27 is present on the upstream side of the fuel processor 15. However, when the gas is leaked to outside from the gas cutoff valve 2, in order to discover the leakage of the gas by the odor at the early stage, it is preferable to provide the desulfurizer 27 on the downstream side of the gas cutoff valve 2.

Further, although in Embodiments 4, 5, sulfur is included as odorizing component in a combustible gas Further, also in Embodiments 2 through 5, similar to the description of FIG. 2, a plurality of pieces of the gas cutoff valves may be provided at any positions of the gas supply path 1 reaching the combustors 4, 16.

When the plurality of gas cutoff valves are provided in this way, in order to discover the leakage of the gas by the odor at the early stage, it is preferable to provide the desulfurizer 27 in Embodiments 4, 5 on the downstream side of at least the upstreammost gas cutoff valve in the plurality of gas cutoff valves. Further, the upstreammost gas cutoff valve of the gas supply path 1 is controlled to open and close by the control units 10, 25 and 26 along with the gas cutoff valve on the downstream side and does not correspond to the gas cutoff valve at the inside of the microcomputer gas meter.

Further, although according to Embodiments 1 through 5, the control units 10, 25, 26 and the combustor 4, 16 are arranged at the inside of the same cabinets 8, 11, an interval of the control unit and the combustor may be spacially partitioned by providing a partition wall or the like.

Further, although according to Embodiments 1 through 5, the gas leakage detection unit 9 determines presence or absence of the leakage based on the detecting signal by the gas leakage detection unit 9, the gas leakage detection unit 9 may transmit the detecting value to the control units 10, 25, 26 and the control units 10, 25, 26 may determine presence or absence of leakage from the detecting value.

INDUSTRIAL APPLICABILITY

According to the combustion apparatus of the present invention, even when the gas is leaked from the gas cutoff valve or the like to outside of the gas supply path, an effect of capable of maintaining the safety by avoiding a dangerous event of firing or the like is provided, which is useful as the fuel processing apparatus of generating hydrogen, and the fuel cell cogeneration system or the like.

The invention claimed is:

1. A combustion apparatus, comprising:
a combustor for combusting a combustible gas;
a gas supply path which connects the combustor and a gas infrastructure of the combustible gas so as to establish a gas communication between the gas infrastructure and the combustor;
a path of an exhaust gas exhausted from the combustor, the path being connected to the combustor;
a controller for controlling combustion of the combustor;
a plurality of gas cutoff valves provided on the gas supply path on an upstream side of the combustor and controlled by the controller; and
a structure body which partitions off a second space including at least one of the plurality of gas cutoff valves, a portion of the gas supply path connected to a downstream side of the at least one of the plurality of gas cutoff valves, which are provided on a downstream side of a most-upstream gas cutoff valve on said gas supply path, said combustor, and said controller from a first space including at least said most-upstream gas cutoff valve.

2. The combustion apparatus according to claim 1, further comprising:
a cabinet provided to cover the combustor and the controller, said cabinet being said structure body,
wherein the most-upstream gas cutoff valve is arranged at the outside of the cabinet.

3. The combustion apparatus according to claim 1, further comprising:
a cabinet provided to cover the combustor, the controller, and the at least one of the plurality of gas cutoff valves,
wherein said structure body is a partition wall at an inside of the cabinet, which is formed between the second space including the combustor and the controller and the first space including the most-upstream gas cutoff valve, and
the first space and the second space are formed by the cabinet and the partition wall.

4. The combustion apparatus according to claim 3, further comprising a first communication port of communicating the first space with the atmosphere.

5. The combustion apparatus according to claim 3, further comprising a second communication port of communicating the second space with the atmosphere.

6. The combustion apparatus according to claim 5, further comprising:
a ventilator for exhausting a gas at the inside of the second space to the atmosphere from the second communication port,
wherein the gas at the inside of the second space is forcibly exhausted by the ventilator.

7. The combustion apparatus according to claim 1, wherein the combustible gas includes an odorizing component.

8. The combustion apparatus according to claim 7, further comprising:
an odorizing component remover provided at the gas supply path for removing the odorizing component,
wherein the odorizing component remover is provided on a downstream side of the most-upstream gas cutoff valve.

9. The combustion apparatus according to claim 1, further comprising:
a combustible gas sensor provided at a space on a side of the combustor and the controller for detecting the combustible gas leaked to inside of the space,
wherein the controller controls to cut off the plurality of gas cutoff valves based on a detecting value of the combustible gas sensor.

10. A fuel processing apparatus, comprising:
the combustion apparatus according to claim 1; and
a reformer of generating a hydrogen-containing gas by reforming a raw material by heating of the combustion apparatus.

11. A fuel cell power generation system, comprising:
the fuel processing apparatus according to claim 10; and
a fuel cell of generating a power by using a hydrogen-containing gas delivered from the fuel processing apparatus.

* * * * *